United States Patent [19]

Senger et al.

[11] 4,135,566
[45] Jan. 23, 1979

[54] BELTED PNEUMATIC TIRES

[75] Inventors: Gerhard F. Senger; Dionysius J. Poqué, both of Aachen, Germany

[73] Assignee: Uniroyal GmbH, Aachen, Germany

[21] Appl. No.: 806,975

[22] Filed: Jun. 16, 1977

Related U.S. Application Data

[60] Continuation of Ser. No. 431,172, is a division of Ser. No. 238,076, Mar. 27, 1972, Pat. No. 3,831,656.

[30] Foreign Application Priority Data

Apr. 1, 1971 [DE] Fed. Rep. of Germany ....... 2115914

[51] Int. Cl.² .............................................. B60C 9/18
[52] U.S. Cl. ...................... 152/361 FP; 152/361 DM
[58] Field of Search ...... 152/361 R, 361 FP, 361 DM

[56] References Cited

U.S. PATENT DOCUMENTS

| 3,554,261 | 1/1971 | Mirtain et al. | 152/361 FP |
| 3,664,404 | 5/1972 | Twardzik | 152/361 FP |
| 3,717,190 | 2/1973 | Boileau | 152/361 FP |

FOREIGN PATENT DOCUMENTS 1586370 2/1970 France .............................. 152/361 FP Primary Examiner—Francis S. Husar
Assistant Examiner—D. W. Underwood
Attorney, Agent, or Firm—Philip Rodman

[57] ABSTRACT

Belted pneumatic tire having a reinforcing textile layer disposed between the tread and the carcass. The reinforcing textile layer can be transversely continuous or discontinuous across the crown region of the tire and extends into the shoulder areas. In the shoulder areas the reinforcement is a plural layer formed by a folding over of the textile. The tire may include a metallic breaker located above or below the textile reinforcement. The folded portion of the textile extends beyond the marginal edges by the metal breaker. The cords of either the textile or metal layers can be oriented at zero degrees to the equatorial plane of the tire.

11 Claims, 9 Drawing Figures

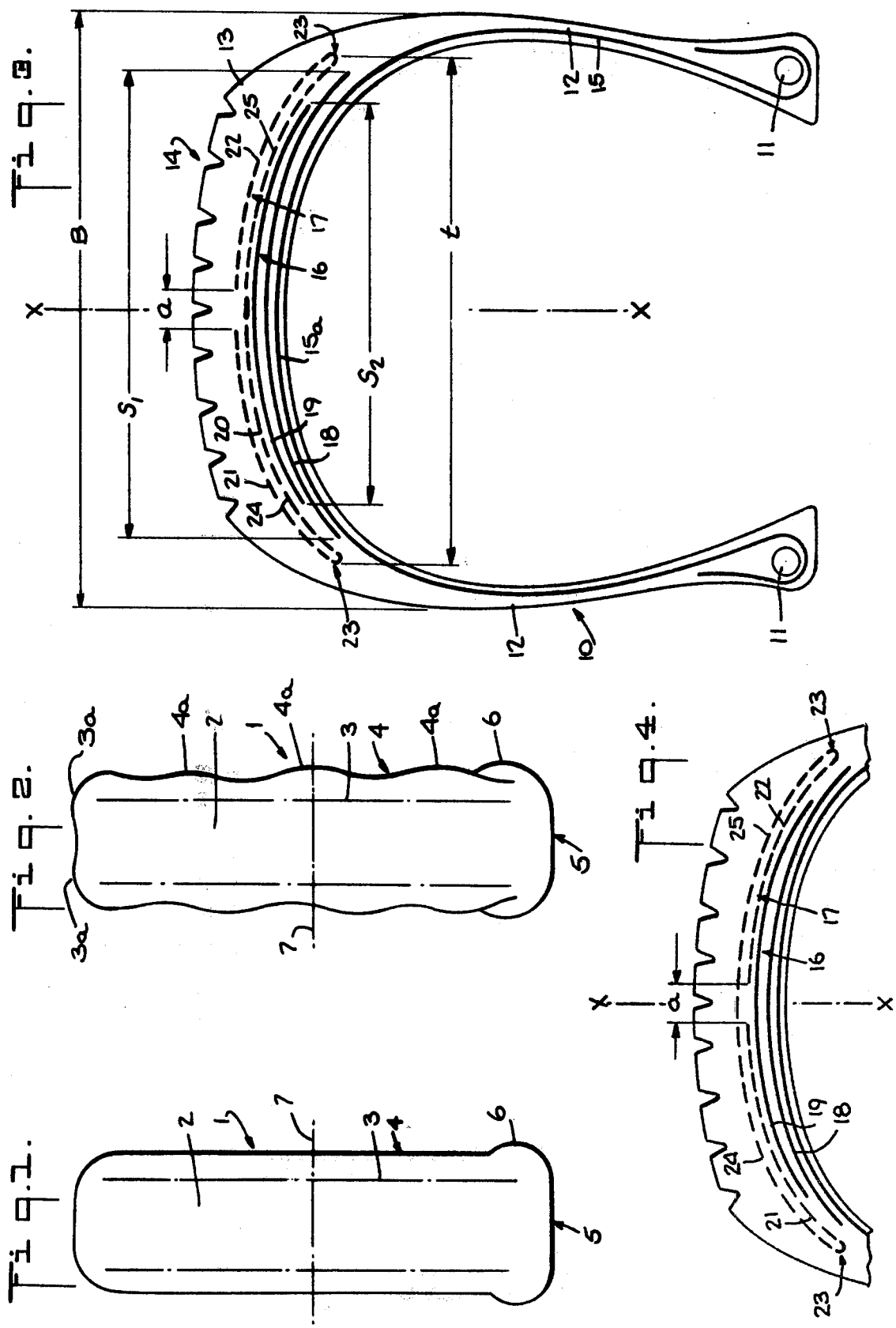

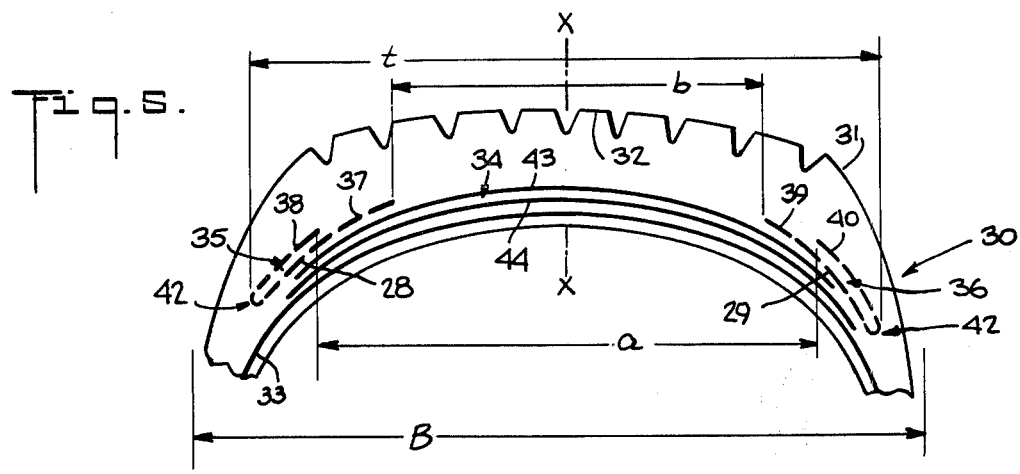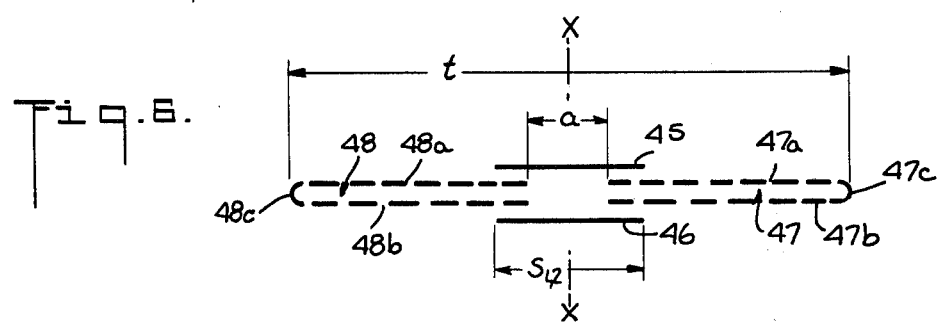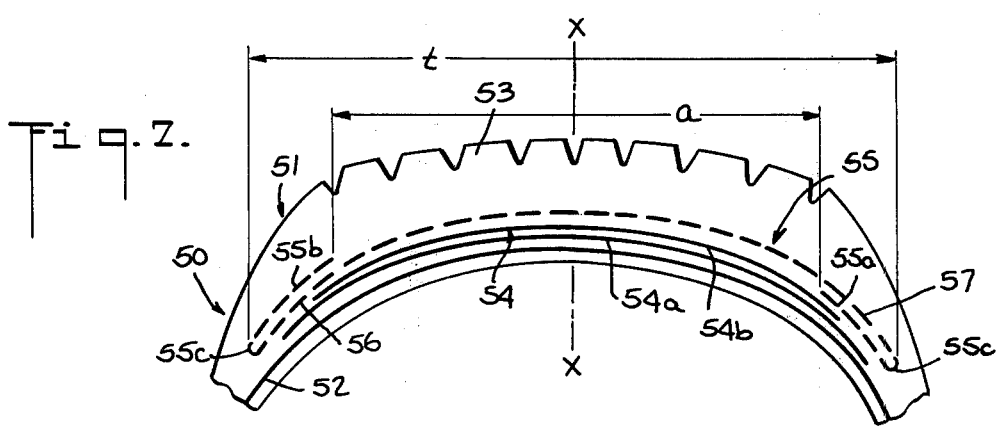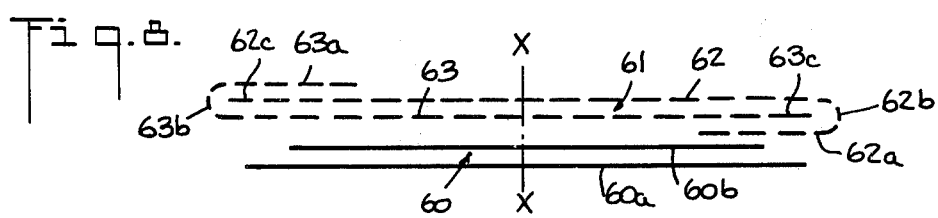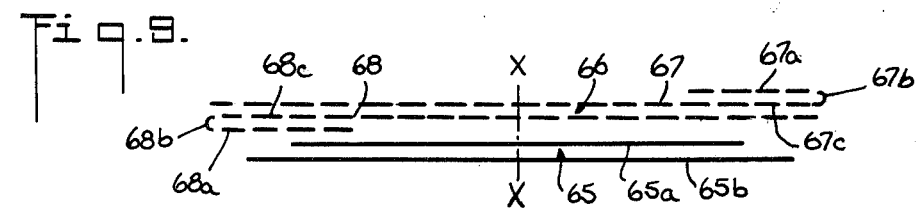

BELTED PNEUMATIC TIRES

This is a continuation, of application Ser. No. 431,172, filed Jan. 7, 1974 and now abandoned, which was a division of application Ser. No. 238,076, filed Mar. 27, 1972 and now U.S. Pat. No. 3,831,656 issued Aug. 27, 1974.

The foregoing abstract is not to be taken either as a complete description or as a limitation of the present invention. The invention is to be understood by the following detailed description and the scope of the invention is to be determined by the claims.

This invention relates to an improved belt or breaker for pneumatic tires having a radial carcass or a substantially radial carcass.

It is known that the belts or breakers which are part of the construction of pneumatic tires are designed to counteract the forces of internal pressure to which they are subjected, as well as forces such as tensions or compressions of dynamic origin, and to counteract the deformations to which they are subjected in service, under the influence, for example, of accelerations or decelerations of the vehicle, centrifugal forces when turning, or high speeds in a straight line.

In the course of the displacement of the vehicle equipped with such tires, these forces vary substantially. The construction of the belt or breaker must therefore be such that it will withstand in an optimum manner, the effects of these various forces. The belt or breaker, especially for radial ply carcass tires, are composed of superposed mutually crossed rubberized plies of parallel essentially inextensible textile cords or steel cables or strips of steel or monofilaments.

In this type of belt or breaker constructed of different materials such as steel and textile, each assumes a different function. Thus the textile breaker plies insure a resistance to stretching and compression along the parallels to the equatorial plane of the tire carcass, while the metal plies insure resistance to stretching and compression along the directions perpendicular to the equatorial plane, that is to say along the meridians of the casing.

In view of the functions thus assigned to each of these layers of belt plies, it has been found that certain arrangements of these layers were preferable to others, in view of certain criteria such as comfort or weight, or with a view to reconciling certain qualities of tires which up to now seemed impossible to combine in one and the same tire.

It is an object of the present invention, therefore, to provide belted pneumatic tires having a novel and improved breaker construction.

A more particular object of the present invention is a novel and improved belted pneumatic tire with a breaker constructed to provide desirable qualities of road holding ability, driving comfort, lightness in weight, high speed capability and high wear resistance.

The present invention is a pneumatic vehicle tire designed especially for high and maximum vehicle speeds. The tire has a radial casing and a belt or breaker placed between the crown region of the carcass and the tread. The belt or breaker comprises a metallic reinforced first ply structure and a non-metallic second ply structure that is concentric with the first ply structure and preferably extends laterally beyond the marginal edges of the first ply structure.

Actual experience with tires of the type described above has shown that as the speed of the vehicle increases above values around 200 km/h, waves form at the contact surface between the tire and the road and propagate around the circumference and the periphery of the tire. This undulation becomes stronger as speed increases and ultimately leads to premature failure of the tire. In addition, the tread surface of the tire is itself subject to deformation such that at least one, and perhaps both shoulders of the tread surface, rises above the crown area of the tire and assume diameters larger than that at the crown. This phenomenon also results in an increased rate of wear at the shoulders and weakening of the bonds between the individual plies in this region.

According to the present invention, a belt or breaker is disposed circumferentially about the crown region of the carcass and directly under the tread. The breaker comprises a first ply structure having elongated metallic reinforcing elements and a second ply structure arranged in superimposed concentric relationship to the first ply structure. The elongated reinforcing elements of the second ply structure are non-metallic, and, preferably, a textile material. The first ply structure comprises a plurality of layers, which may be of unequal width, when measured transversely across the crown region of the carcass. The first ply structure is preferably symmetrically disposed relative to the equatorial plane of the tire. The second ply structure comprises at least one layer which may be transversely continuous or discontinuous across the crown region of the carcass. The second ply structure is formed by at least one layer folded back upon itself, the folded over portion having a transverse width not greater than the transverse width of the adjacent juxtaposed layer, preferably the transverse width of the folded over portion is less than the transverse width of the adjacent juxtaposed layer. Alternatively the transverse width of the folded over portion and the adjacent juxtaposed layer may be equal. The folded marginal edge formed by the layer of second ply structure extends beyond the marginal edge of the first ply structure, and, preferably may extend into the shoulder region of the tire tread. The second ply structure may be located between the plural layers of the first ply structure or it may be located between the tread and the first ply structure. The folded over portion formed as either one or both marginal edges of the second ply structure may be folded so as to lie above or under the adjacent juxtaposed layer. The elongated reinforcing elements of either the first or the second ply structure may be oriented at an angle of zero degrees to the equatorial plane of the tire. Where the elements of one ply structure is at zero degrees, the elements of the other ply structure are oriented at an angle between zero and twenty-five degrees to the equatorial plane of the tire.

According to the construction of the tire of the present invention, the shoulder regions are strengthened so as to prevent ply separation and reduce the distortions, deformations, undulations or waves which tend to occur during high speed usage. The non-metallic reinforcing elements of the second ply structure are a textile in order to prevent the overall weight of the tire from becoming excessive. In addition, textile reinforcing elements tend to improve the riding characteristics of the tire.

The invention will be better understood from the detailed description of several embodiments thereof when read in conjunction with the accompanying drawings, in which:

FIG. 1 shows a pneumatic tire under normal load as viewed in a plane perpendicular to the rolling axis and in a plane coincident to the equatorial plane;

FIG. 2 shows a pneumatic tire when viewed according to FIG. 1, the tire being under normal load but at a high speed;

FIG. 3 shows a schematic transverse cross-section of the tire according to one embodiment of the invention;

FIG. 4 shows a schematic transverse partial cross-section of the tire according to another embodiment of the invention;

FIGS. 5 and 7 show a schematic transverse cross-section of the tire according to further embodiments of the invention;

FIGS. 6, 8 and 9 show a schematic cross-section of only the belt or breaker first and second ply structures according to still further embodiments of the invention.

FIG. 1 shows a belted tire 1 for high and maximum vehicle speeds having a tread 2, shoulder 3 and sidewalls 4. In the tread print region 5, the tire sidewalls 4 develop a distortion spread 6 under the load imposed on the rolling or rotational axis 7 of the tire by the weight, speed and direction of the vehicle, the road construction and related causes. FIG. 2 shows the same tire under the same load at high and maximum vehicle speeds. It is seen that waves 4a form on the sidewalls 4 of the tire at the tread print 5 and propagate circumferentially and peripherally of the tire. In the same way, the tread surface 2 is deformed, with the shoulder regions 3a rising above the crown of the tread surface 2. Both of these effects result in an increased rate of wear or failure of the tire.

The invention according to the embodiment of FIG. 3 is a tire 10 having bead rings 11, sidewalls 12 and a carcass 15, preferably a radial carcass. A belt or breaker comprising a first ply structure 16 and a second ply structure 17 is placed over the crown region 15a of the carcass and under the tread 14. The second ply structure is superimposed over and concentric with the first ply structure. The first ply structure 16 comprises a plurality preferably two, ply layers 18, 19 having elongated metallic reinforcing elements. The metal preferably is steel. Layers 18, 19 may be of unequal width, and as shown in FIG. 3, layer 18, which is in contact with carcass 15, has a width $S_1$ greater than the width $S_2$ of the overlying layers 19. The layers 18, 19 of the first ply structure are preferably arranged symmetrically to the equatorial plane X—X of the tire 10. The second ply structure 17 comprises at least one layer having elongated non-metallic reinforcing elements. The non-metallic reinforcing elements may be a natural or synthetic textile, for example, cotton, rayon, nylon or polyester, or may be a glass. The layer of the second ply structure 17 in the embodiment shown in FIG. 3, is formed by a strip 20 of a single width whose margins 21 and 22 are folded back upon the juxtaposed adjacent layer portion 24 and 25, respectively for a distance not greater than the width of the adjacent juxtaposed layer portions. The folding back upon itself of the layer 20 forms a folded marginal edge 23 which extends beyond the marginal edge of the first ply structure. In order to further strengthen the shoulder areas 3 of the tire and further reduce the possibility of ply separation, the folded marginal edge 23 can extend into the shoulders 3. As shown in FIG. 3, the overall width t of the second ply structure 17 is greater than the overall or maximum width of the first ply structure, as represented by the width $S_1$ of the transversely widest layer 18.

The overall total width of the tire shown in FIG. 3 is indicated as B, and the distance between the marginal edges of the folded back portion 21, 22 is indicated by a.

As noted above, the material for the reinforcing elements of the second ply structure may be textile. If the textile is rayon, the strength of the reinforcing elements should be higher than the carcass 15 reinforcing elements. The second ply structure rayon reinforcing elements should have an elastic modulus up to $2 \times 10^5$ kg/mm$^2$. When other synthetic textile materials are used as the reinforcing elements of the second ply structure, e.g., nylon, polyester, the preferred materials are those that show considerable shrinkage on cooling after vulcanization and remain pre-stressed in the tire.

The reinforcing elements of the first and second ply structures, 16 and 17, may be made from cords, cables, wire, strands, strips, fibers or filaments. Preferably the reinforcing elements in the same layer are parallel to each other when disposed about the crown region 15a of the carcass 15. The reinforcing elements of either the first or the second ply structure are preferably oriented at an angle of zero degrees to the equatorial plane X—X of the tire. When the reinforcing elements of one ply structure are oriented at zero degrees, the reinforcing elements of the other ply structure preferably are oriented at an angle between zero and twenty-five degrees to the equatorial plane of the tire. When the reinforcing elements are oriented at an angle other than zero degrees, the angular direction of adjacent plies are opposite and equal in degrees.

The non-metallic ply structure may be constituted by a single length of weftless 0° breaker cord fabric, in which all the cords extend substantially parallel to the longitudinal dimension of the fabric, wound in a continuous spiral circumferentially about the crown region 15a of the carcass 15 for at least a plural number of full turns equal to the number of layers desired. Preferably, the length of the cord fabric is wound in a continuous spiral circumferentially of the tire carcass for somewhat more than the requisite number of full turns, i.e., to include a small fraction of an additional turn, so as to dispose the outer terminal end section of the fabric in overlapping relation to the inner terminal end section by an initial amount equal to between about 10 and 30mm and preferably about 20mm. After vulcanization, the boundary of the overlapping end section has a generally curved shape. The value of the overlap diminishes from the edges of the outer ply from, for example, 30mm, to approximately 5mm at the median equatorial plane X—X.

FIG. 4 shows another embodiment of the invention wherein the folded back portion 21, 22 lies under the adjacent juxtaposed layer portion 24, 25. In FIG. 3, the folded back portion 21, 22 lies over or above the adjacent juxtaposed layer portion 24, 25. In the embodiment of FIG. 4, the folded under portion 21, 22, is additionally prevented from distortion by the stability of the metal reinforced first ply structure 16.

By way of example, the width of distance a may range from 0 to 0.75 times the distance B. The preferred value of a in the tire shown in FIGS. 3 and 4, is 0.06B. By way of example, the width $S_1$ may range from 0.07 to 0.85 times the distance B, with a preferred value of 0.8B. The width $S_2$ may range from 0.65 to 0.85B, with a preferred value of 0.68B. The width t may range from 0.75 to 0.9 times B, with a preferred value of 0.85B.

In the embodiment shown in FIG. 5, the tire 30 has a first ply structure 34 comprising two plies 43 and 44 of unequal width which are placed over the crown region of the carcass 33. The second ply structure comprises two strips 35 and 36, each strip having a marginal portion 38, 40 folded back upon the adjacent juxtaposed layer 28, 29. The folding back forms folded marginal edges 42 which extend beyond the marginal edge of the first ply structure and are located between the first ply structure 34 and the tread 32 and extend into the shoulder areas. In this embodiment, the essential effect provided by the second ply structure is to additionally stiffen the shoulder areas of tread 32 and, in addition, to offer substantially the same advantages as described with respect to the embodiments of FIGS. 3 and 4. In the embodiment of FIG. 5 the distance between the marginal edges 37, 39 of the two strips 35, 36 is indicated by b, and the distance between the edges of the folded marginal portions 38, 40 by a. The distance between the folded marginal edges 42 of the two strips 35, 36 is designated as t.

In the embodiment of FIG. 5 the distance b may assume values between 0.4 and 0.65B, with a preferred value of 0.6B. The distance a may have a value between 0.6 and 0.8B, with a preferred value of 0.7B. The distance t is the same as that given with respect to FIGS. 3 and 4. It may be desirable to have narrow layers for the first ply structure, as shown, in the embodiment of FIG. 6. The width, $S_1$, $S_2$, which is the same for both layers 45, 46 of the first ply structure is selected to have a range between 0.12 and 0.25B, with a preferred value of about 0.2B. In the embodiment of FIG. 6, the second ply structure 47, 48 is located between the two layers 45 and 46 of the first ply structure. In a manner similar to the embodiment of FIG. 5, the second ply structure may comprise two strips 47 and 48, each of which have margins 47a, 47b, 48a 48b, to form folded marginal edges 47c, 48c. The relative value of the distances a and t are the same as that given with respect to FIGS. 3 and 4.

In the embodiment shown in FIG. 7, the tire 51 has a first ply structure 54 comprising two plies 54a and 54b, of unequal width located transversely over the crown region of carcass 52. The second ply structure 55 is located between the first ply structure and the tread 53. In a manner similar to the embodiments of FIGS. 3 and 4, the second ply structure 55 is formed by a single width strip of material with two marginal portions 55a and 55b folded back upon the juxtaposed adjacent layer portion 56, 57. In this embodiment, the marginal folded over portions are folded in opposite directions, i.e., one above and one under the respective adjacent juxtaposed layer portions 56, 57. The arrangement of folded over portions 55a, 55b therefore provides an assymetrically configured tire. The second ply structure has a large width t across the crown region of the carcass 52 and extends laterally on both sides beyond the marginal edges of the underlying first ply structure 54. It is known that the lateral-force behavior of a belted tire is influenced by the orientation of the reinforcing elements in the outermost ply of the belting. Therefore an assymetrical arrangement of the second ply structure is a means of controlling the lateral-force behavior of the tire. This behavior can be varied over a wide range by varying the widths of the folded back portions or the distance a between their marginal edges. In the extreme case the outer folded back portion 55b can be extended to the folded marginal edge 55c on the opposite side. Usually, however, the distance a has a value between 0 and 0.75B. The assymetric configuration shown in FIG. 7 can be reversed such that the marginal portion 55b is folded under the adjacent juxtaposed layer 56 and the marginal portion 55a is folded above the adjacent juxtaposed layer 57.

FIG. 8 and FIG. 9, each of the first ply structures 60 and 65 is formed by two plies 60a, 60b and 65a, 65b respectively, of unequal width, and is placed directly over the crown region of the carcass (not shown). In both embodiments, the superimposed second ply structure 61, 66 comprises two strips, but these strips are folded back only at one marginal edge. The embodiments of FIG. 8 and FIG. 9 are assymetrical and therefore can have the variable characteristics described with respect to FIG. 7.

In the embodiment shown in FIG. 8, the radially inner strip 63 of the second ply structure 61 is folded back upon itself and over one edge 62c (that on the left in FIG. 8) of the strip 62, as indicated by 63a. On the other side, the outer textile strip 62 is folded back upon itself and under the free edge 63c of the inner textile strip 63, as indicated at 62a. The folder marginal portions 62a and 63a form a folded marginal edge 62b and 63b.

In the embodiment shown in FIG. 9, on the other hand, the marginal edge 68a of the inner strip 68 is folded under the adjacent juxtaposed layer portion 68c on the left side of FIG. 9 and the marginal edge 67a of the outer strip 67 is folded above the adjacent juxtaposed layer portion 67c on the right side, as indicated by 68a and 67a, respectively.

The first and second ply structures described with respect to the embodiments of FIGS. 3 to 9 may be made in accordance with the structures described in any of the embodiments. For example, the non-metallic reinforcing elements for the second ply structure may be a natural or synthetic textile or glass. Further the angular orientation of the reinforcing elements of either or both the first and the second ply structures may be in accordance with the description recited with respect to any embodiment. For example, the reinforcing elements of the first ply structure may be at zero degrees to the equatorial plane of the tire when the reinforcing elements of the second ply structure may be at an angle between zero and twenty-five degrees to the equatorial plane. Further the aforesaid angles recited for the reinforcing elements of the first or the second ply structures may be reversed. Similarly the ply structure having a zero degree angle to the equatorial plane may be applied in the manner previously described.

The width of the folded marginal portion can be varied to satisfy particular design requirements of tire materials, load factors, tire size, etc. The width of the folded marginal portion, is however, not greater than or may be equal to the width of the adjacent juxtaposed layer portion. Thus a wide folding back upon itself of the marginal edges of the second ply structure would be desirable for tires subjected to high load factors. A narrower folding back upon itself of the marginal edges of the second ply structure may be desirable for tires subjected to lower or moderate loads. In the extreme arrangement, as noted with respect to FIGS. 8 or 9, the folded marginal portion may extend across the entire width of the adjacent juxtaposed layer and to the opposite folded marginal edge. This extreme arrangement is also applicable to the embodiments of FIGS. 3 to 7.

As disclosed with respect to the embodiments of FIGS. 3, 4, 5, 7, 8 and 9, the second ply structure may be located superimposed over the first ply structure. As disclosed with respect to the embodiment of FIG. 6, the second ply structure may be located between the layers of the first ply structure. Alternatively the second ply structure may be located under the first ply structure in any of the embodiments. Preferably, however, the second ply structure is located superimposed over the first ply structure. This location has the particular advantage when using a textile material having defined shrinkage properties, for the reinforcing elements. Vulcanization of the tire will shrink the textile reinforcing elements and thereby pre-stress the first ply structure and the carcass. Such pre-stressing aids in countering the distorting and failure forces that act upon the tire during high speed driving or during other high load factors.

If particularly stiff resistance is desired the second ply structure can be located between the layers of the first ply structure. A variable degree of stiffness is achieved when the second ply structure is located under the first ply structure. The degree of stiffness varies from the relatively yielding carcass to the somewhat stiffer second ply structure to the higher stiffness provided by the metallic reinforcing elements of the first ply structure. In this manner, the riding comfort of the tire can be selected and adjusted.

The preferred material for the reinforcing elements of the first ply structure is a metal, for example, steel. The preferred material for the reinforcing elements of the second ply structure is a non-metal, in particular, a textile. There is a particular manufacturing advantage of this preferred combination of materials. This combination makes it unnecessary to fold a layer having metallic reinforcing elements. Instead the relatively yielding textile reinforced layer is folded back upon itself.

The folding back upon itself of the second ply structure assists in preventing separation of the layers of the belt in the shoulder area at high speeds. In addition, the folding back suppresses the tendency of the shoulder areas to rise higher than the crown region of the tread and the formation of undulation, waves, distortions and the like along the sidewalls and the periphery of the tire.

Further, the breaker according to the present invention, permits the tire to be lighter in weight and therefore provide a more comfortable riding tire. The reduction in weight is due to the use of a textile instead of only metal reinforcing breaker elements. In addition the density of the reinforcing elements of the plural metal ply-layers can be reduced because the textile ply-layer provides additional tread reinforcement.

It will be understood that the foregoing disclosure of preferred embodiments of the present invention is for purposes of illustration only, and that the various structural and operational features disclosed may be modified and changed in a number of ways none of which involves any departure from the spirit and scope of the invention as defined in the hereto appended claims.

Having thus described the invention, what is claimed and desired to be protected by Letters Patent is:

1. A pneumatic tire having a carcass, a tread surrounding the crown region of the carcass and a tread reinforcing breaker disposed circumferentially about the crown region of the carcass between the carcass and the tread, the breaker comprising a first ply structure of elongated metallic reinforcing elements including a plurality of layers disposed symmetrically to the equatorial plane of the tire, with opposite marginal edges, the width of the layers of the first ply structure being equal, and measuring approximately 12% to 25% of the overall total width of the tire, and a second ply structure of elongated non-metallic reinforcing elements, said second ply structure being arranged in concentric relationship to the first ply structure between two layers of the first ply structure, said second ply structure comprising at least two parts transversely discontinuous across the crown region and disposed symmetrically with respect to the equatorial plane of the tire, each said part comprising at least one layer folded back upon itself to define a folded over portion and an adjacent layer portion in contact with each other, with a marginal fold directed toward a shoulder area of the tire and extending beyond respective said marginal edges of the first ply structure, the width of the folded over portion being equal to the width of the adjacent layer portion, the folded over portion being at a greater distance from the carcass than the adjacent layer and having a width not greater than the width of the adjacent layer, said folded over portion and said adjacent layer portion having edges directed toward the equatorial plane of the tire.

2. A pneumatic tire as claimed in claim 1 wherein the width of the first ply structure is approximately 20% of the overall total width of the tire.

3. A pneumatic tire as claimed in claim 1 wherein the distance between the edges of the symmetrical folded over portions equals the distance between the edges of the symmetrical adjacent layer portions and is approximately 0% to 75% of the overall total width of the tire.

4. A pneumatic tire as claimed in claim 2 wherein the distance between the edges of the symmetrical folded over portion equals the distance between the edges of the symmetrical adjacent layer portions and is approximately 6% of the overall total width of the tire.

5. A pneumatic tire as claimed in claim 3 wherein the distance between the symmetrical marginal folds is approximately 75% to 90% of the overall total width of the tire.

6. A pneumatic tire as claimed in claim 4 wherein the distance between the symmetrical marginal folds is approximately 85% of the overall total width of the tire.

7. A pneumatic tire as claimed in claim 1 wherein the reinforcing elements of the second ply structure are textile.

8. A pneumatic tire as claimed in claim 1 wherein the elongated metallic reinforcing elements of the first ply structure are oriented at an angle of zero degrees to the equatorial plane of the tire.

9. A pneumatic tire as claimed in claim 8 wherein the elongated non-metallic reinforcing elements of the second ply structure are oriented at an angle between 0 and 25 degrees to the equatorial plane of the tire.

10. A pneumatic tire as claimed in claim 1 wherein the elongated non-metallic reinforcing elements of the second ply structure are oriented at an angle of zero degrees to the equatorial plane of the tire.

11. A pneumatic tire as claimed in claim 10 wherein the elongated matallic reinforcing elements of the first ply structure are oriented at an angle between 0 and 25 degrees to the equatorial plane of the tire.

* * * * *